Oct. 4, 1955 G. A. MITCHELL 2,719,455
KINETOGRAPH MECHANISM HAVING TWO CLAW ARMS
Filed Jan. 6, 1953 2 Sheets-Sheet 1
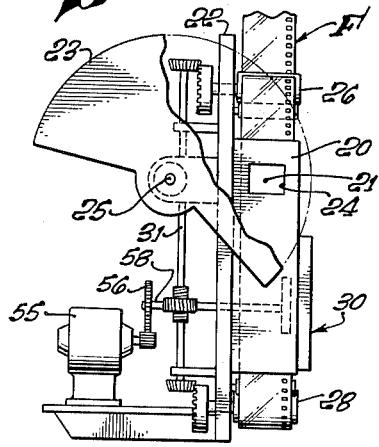
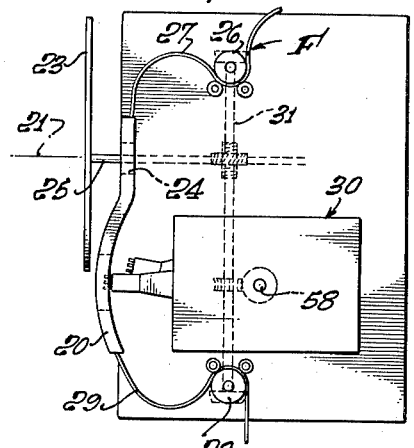
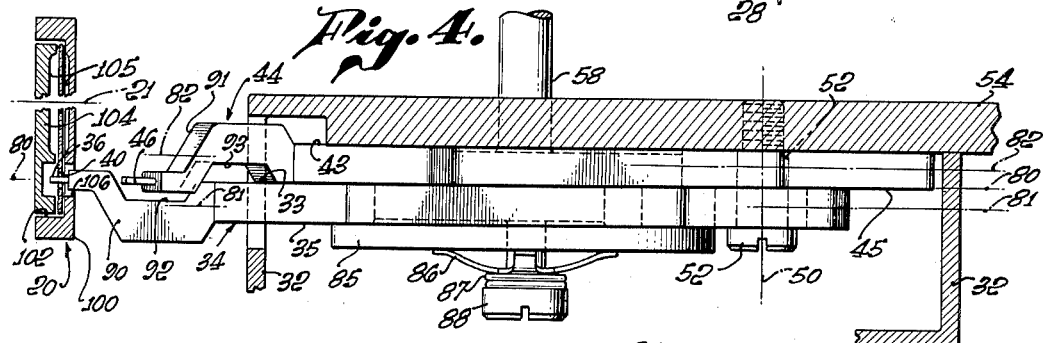
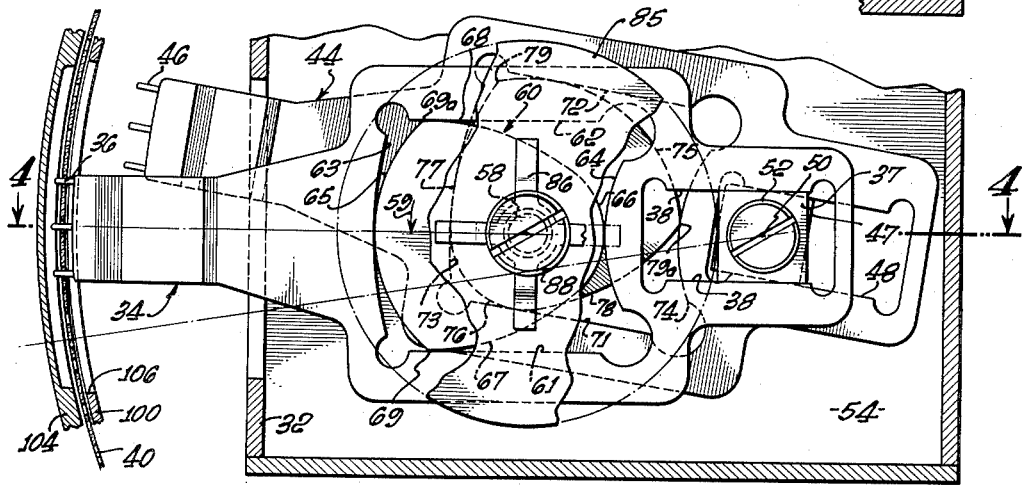
INVENTOR.
GEORGE A. MITCHELL,
BY Barkelew & Scantlebury
ATTORNEYS.

Oct. 4, 1955
G. A. MITCHELL
2,719,455
KINETOGRAPH MECHANISM HAVING TWO CLAW ARMS
Filed Jan. 6, 1953
2 Sheets-Sheet 2
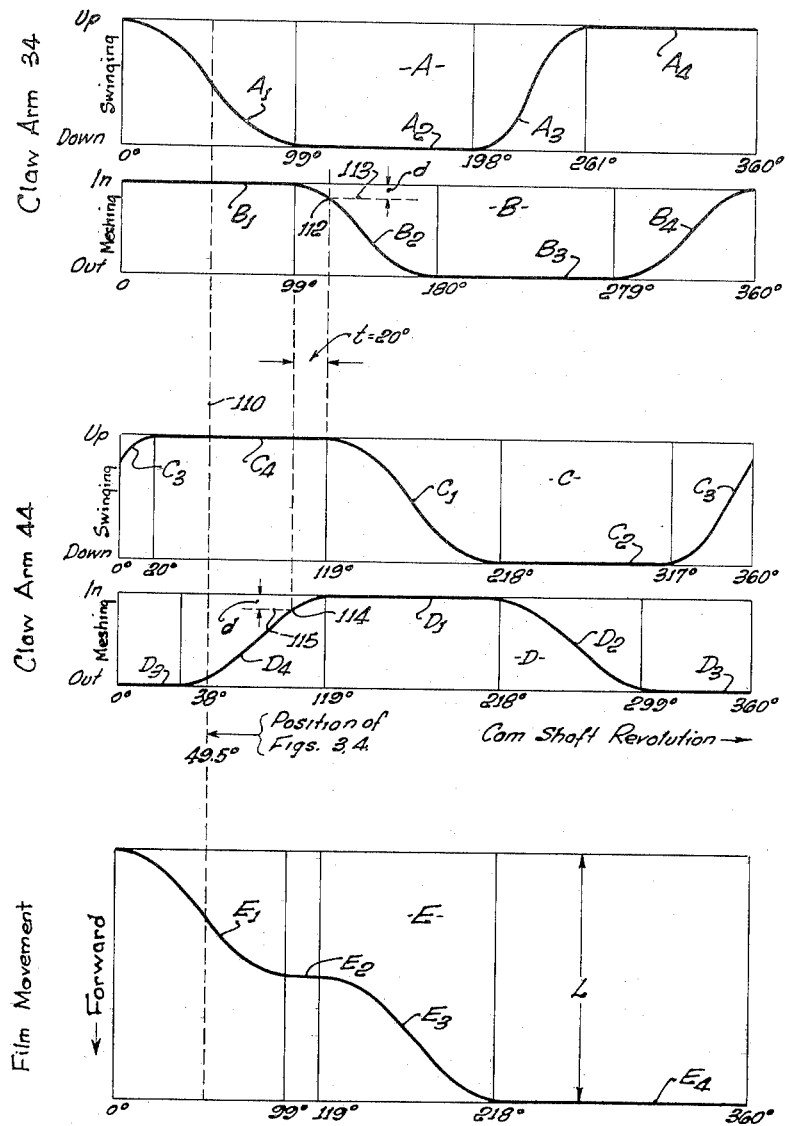
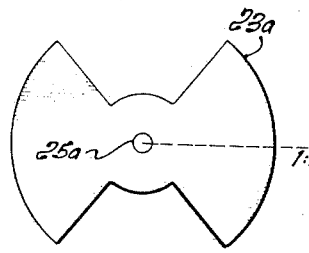
INVENTOR.
GEORGE A. MITCHELL,
BY
Bankelew & Scantlebury
ATTORNEYS.

United States Patent Office 2,719,455
Patented Oct. 4, 1955

2,719,455

KINETOGRAPH MECHANISM HAVING TWO CLAW ARMS

George A. Mitchell, Pasadena, Calif., assignor to Mitchell Camera Corporation, Glendale, Calif., a corporation of Delaware Application January 6, 1953, Serial No. 329,887

7 Claims. (Cl. 88—18.4)

This invention is concerned generally with kinetograph mechanisms of the claw type for intermittently advancing a motion picture film or the like.

An important object of the invention is to provide a mechanism of moderate physical size which is nevertheless capable of advancing a film through a relatively great distance between successive exposures. Such a mechanism is particularly useful in connection with film of larger size than that most commonly used in commercial motion picture practice. Film that is 70 mm. in width, for example, has repeatedly been proposed for many special purposes, such as for scientific work, for providing improved definition and greater screen brightness, and for producing projected motion pictures of larger screen size. In spite of obvious theoretical advantages, oversize film has achieved little commercial success, largely because of the practical difficulty of providing compact and vibration-free mechanism for intermittently advancing the film the required relatively great distance between frames. Such mechanism is provided by the present invention.

A further object of the invention is to provide a film moving mechanism which advances the film in a series of distinct movements in relatively rapid succession, through respective distances the sum of which is the required frame distance, and then holds the film stationary for an appreciable period of film dwell before repeating the cycle.

A further aspect of the invention concerns a particularly compact and economical mechanism of claw type comprising two distinct claw arms driven from a common cam shaft and having film engaging claws that act in a common plane. Such a mechanism provides a preferred means for producing the type of film movement already described. In particular, each claw arm may be driven by a single boxed cam, and under that condition a preferred cam form is one that provides a dwell period in the meshing movement of the claw that is equal to, and coincident with, the film pull-down stroke.

A dual claw arm mechanism of the type described, but with suitable modifications, is also useful for producing a periodic series of uniformly spaced film movements having a period equal to one half the period of operation of each individual claw arm. In that form, the mechanism is particularly useful in kinetograph machines intended to operate at relatively high frame speed, since the number of frames exposed per cycle of the mechanism is twice that of a conventional claw movement.

A full understanding of the invention and of its further objects and advantages will be had from the following description of certain illustrative embodiments, of which the accompanying drawings form a part. The particulars of those embodiments are intended only for purposes of illustration, and are not to be construed as limitations on the scope of the invention, which is defined in the appended claims.

In the drawings:

Fig. 1 is a front elevation showing in somewhat schematic form an illustrative kinetograph mechanism embodying the invention in a typical preferred form;

Fig. 2 is a side elevation corresponding to Fig. 1;

Fig. 3 is a fragmentary section in the same aspect as Fig. 2 and at enlarged scale;

Fig. 4 is a horizontal section on line 4—4 of Fig. 3;

Fig. 5 is a schematic diagram illustrating a typical cycle of operation corresponding to Figs. 3 and 4; and Fig. 6 is a schematic drawing, illustrating a modification.

In the illustrative embodiment of Figs. 1–4, a film guide is represented at 20, mounted on the vertical frame plate 22. An exposure aperture is shown at 24 in the film guide, with an optical axis represented schematically at 21. The exposure aperture may function, for example, to admit light to a film in a camera or to transmit a beam of light for projecting an image of the film, as in a projector. Any such process will be referred to for convenience as film exposure. Film guide 20 is suitably formed to guide a motion picture film F past exposure aperture 24 in known manner. Film F is typically supplied to the upper end of the film guide from a supply reel, not shown, by the supply sprocket 26 via a loose loop 27; and may be taken up from the lower end of the film guide via another loose loop 29 by the hold back sprocket 28. The film is then typically wound on a takeup reel, not shown. The film is advanced intermittently along film guide 20 by an intermittent mechanism, indicated generally by the numeral 30, which is preferably enclosed by a case 32. The illustrated vertical position of the film guide and the downward movement of the film through the guide are here adopted for clarity of description and are not intended as a limitation on the scope of the invention.

A shutter is indicated at 23, rigidly mounted on shutter shaft 25 in position to control the passage of light through exposure aperture 24. Power means for the mechanism may comprise an electric motor, indicated at 55, driving the movement shaft 58 via gearing 56. Movement shaft 58 in the present embodiment is the cam shaft of the movement. Shutter 23 and sprockets 26 and 28 are driven in definite speed and phase relation to the intermittent movement by any suitable means, shown illustratively as a coupling shaft 31, geared directly to shutter shaft 25, to the sprocket shafts, and to movement shaft 58. The ratios of the gears acting between movement shaft 58 and shutter shaft 25 are such that the overall speed ratio between those shafts, with a shutter of the type shown, is one to one.

The illustrative movement shown more particularly in Figs. 3 and 4 employs two distinct claw arms 34 and 44, which carry respective claw formations 36 and 46. Those claw formations may be of many different types known in the art. In the form shown illustratively, each claw formation comprises three claw teeth adapted to engage three adjacent film perforations, indicated at 40. The claw arms 34 and 44 are driven in cycles of movement that include respective film advancing strokes. Those cycles of movement, and more particularly the film advancing strokes of the cycles, are driven in definite mutual phase relation to be described in detail. While the two claw arms are not required to have any particular spacial relation, and while any suitable means may be employed for driving the claw arms in such phase relation, it is preferred that they be driven from the same cam shaft in a closely integrated manner to be described.

As illustrated, the two claw arms are slidingly pivoted in any suitable manner for longitudinal translation and for swinging movement with respect to a common pivot axis, indicated at 50. It is broadly immaterial whether the pivot axis is fixed with relation to the frame of the machine or with respect to the claw arm. As shown, a pivot stud 52 is fixed in frame member 54, which forms the back wall of movement case 32. Bearing blocks 37 and 47 are rotatably mounted on pivot stud 52 and are slidable with respect to claw arms 34 and 44 by means of longitudinal pivot ways 38 and 48, respectively. The sliding movement of the claw arms permits their carried claw teeth to move in meshing strokes into and out of intermittent engagement with perforations of a film F in film guide 20. The swinging movement of the claw arms permits intermittent longitudinal advancement of the film forward (downward as illustratively shown) by a forward or pull-down stroke of a claw arm during its period of film engagement, and permits a return stroke of the claw arm during its period of film release.

Each claw arm is driven in a periodic cycle of movement that includes four more or less distinct strokes. While it is ordinarily preferred that each stroke of the cycle be completed before the following stroke begins, a certain amount of overlapping may be permissible, particularly of the return stroke and a meshing stroke; and a period of claw arm dwell may alternatively be provided between successive strokes. Many different detailed mechanisms are known to the art, by which a slidingly pivoted claw arm may be driven in such a cycle of movement. An important aspect of the present invention, in addition to certain structural features to be described, concerns the close relationship between the mechanisms that are employed for driving the two claw arms.

In the particular embodiment of Figs. 3 and 4, the driving means for each claw arm is of the type in which both the swinging and translational movements of the claw arm are driven by cam means mounted on a cam shaft 58. The cam means may be of any of many known types, being shown illustratively as a single cam of constant width type engaging cam followers of box type on the claw arm. Claw arm 34 is driven by cam 60, rigidly mounted on cam shaft 58. The cam shaft is journaled in any suitable manner as in frame member 54. Claw arm 34 carries two opposingly spaced longitudinal cam follower surfaces 61 and 62, and two opposingly spaced transverse follower surfaces 63 and 64, which form a cam box that continuously engages and is positively driven by cam 60.

As shown, cam 60 has two concentric circular dwell faces 65 and 66 of greater and lesser radii, respectively, which are connected by two stroke faces 67 and 68, which are tangent to inner dwell face 66 and meet outer dwell face 65 at the cam corners 69 and 69a. Each stroke face is preferably circularly curved with its center of curvature at the opposite cam corner. The cam corners will be considered to form parts of the respective adjacent stroke faces. As illustrated in Fig. 3, cam shaft 58 is normally driven counterclockwise, as indicated by the arrow 59. Under that condition, cam corners 69 and 69a will be considered the leading and trailing cam corners, respectively, and stroke faces 67 and 68 will be considered the leading and trailing stroke faces, respectively.

Claw arm 44 is driven by the cam 70, rigidly mounted on cam shaft 58 inwardly of cam 60. Cams 60 and 70 preferably, although not necessarily, are of identical shape and size and engage effectively identical follower formations on their respective claw arms. That is true of the mechanism as illustrated, the various follower surfaces of claw arm 44 and the various parts of cam 70 being designated for clarity by numerals that correspond in final digit to those already described for claw arm 34 and cam 60, the first digit being in each instance higher by one. The two cams are mounted on shaft 58 with a definitely predetermined phase difference, shown illustratively as 119° in the present embodiment for reasons that will be described.

Claw arm 34 and 44 have respective movement planes, indicated at 81 and 82, which are normal to cam shaft 58 and are axially spaced with respect to that shaft in any convenient manner. The claw arms may be confined to their respective movement planes in any suitable manner, their positions in those planes being controlled by the cooperative action of pivot 52 and the respective cams 60 and 70. As illustratively shown, claw arm 44 is confined to plane 82 by sliding engagement of its inner face 43 with a flat face of frame member 54, and of its outer face 45 with claw arm 34; and claw arm 34 is confined to plane 81 by sliding engagement of its inner face 33 with claw arm 44 and of its outer face 35 with a pressure plate 85. That plate may be guided by the outer portion of cam shaft 58 and spring pressed inward by any suitable means, shown illustratively as the resilient spider 86, the thrust bearing 87 and the retaining screw 88, threaded into the end of the shaft. As illustratively shown, cams 60 and 70 are immediately adjacent axially of the cam shaft.

In the preferred embodiment of Figs. 3 and 4, claw teeth 36 and 46 are mounted on their respective claw arms 34 and 44 in such offset relation that both sets of claw teeth lie in a common plane parallel to the movement planes of the claw arms and preferably, although not necessarily, between those planes. As illustrated, both sets of claw teeth are offset, claw teeth 36 being mounted on offset portion 90 of claw arm 34 which projects laterally inwardly of movement plane 81; and claw teeth 46 being mounted on offset portion 91 of claw arm 44, which projects laterally outwardly of movement plane 82. The claws thus lie in a comon plane 80 that is intermediate, and preferably midway between, movement planes 81 and 82. Claw arm 34 is relieved at 92 to form a transverse channel in its inner face 33. That channel provides clearance for the offset portion 91 and for claw teeth 46 of the other claw arm. Similarly, outer face 45 of claw arm 44 is relieved to form a transverse clearance channel 93 for offset portion 90 and for claw teeth 36 of claw arm 34. The vertical widths of the claw arms outward of channels 92 and 93 are sufficiently limited to avoid interference between the claw arms in their respective cycles of movement.

Film guide 20, as illustratively shown, comprises a member 100 rigidly mounted on frame plate 22 and carrying a film channel 102 in one face, and a movable film gate 104 which releasably retains the film in film channel 102. Both members are preferably relieved as indicated at 105 to avoid contact with the image-carrying portions of the film. As illustrated, film F carries a single row of film perforations 40 longitudinally spaced near one film margin. The film guide is provided with a longitudinal slot 106 through which film perforations 40 are accessible to claw teeth 36 and 46. As illustrated, the film is guided in a plane normal to movement planes 81 and 82 for longitudinal movement parallel to those planes, and film perforations 40 lie in common plane 80 in position to be intermittently engaged by the claw teeth of the respective claw arms.

In the drawings the mechanism is typically shown in that phase of its cyclic operation in which first claw arm 34 is at the midpoint of its film advancing or pull-down stroke. That stroke involves swinging movement of claw arm 34 about pivot axis 50 in a counterclockwise direction as seen in Fig. 3. That movement is positively driven by interaction of stroke faces 67 and 68 of cam 60 with longitudinal follower surfaces 61 and 62, respectively, of claw arm 34. During that stroke claw teeth 36 are maintained in film engagement by interaction of cam dwell faces 65 and 66 with transverse follower surfaces 63 and 64, respectively. Those follower surfaces may be of any suitable form. As illustratively shown, they are circularly curved about a common center of curvature which is so located with relation to the claw arm that during the pull-down stroke it lies substantially in pivot axis 50. That follower structure, which is more fully described and is claimed in my copending patent application Serial Number 218,361, filed March 30, 1951, now Patent 2,660,918 dated December 1, 1953, has the particular advantage that the pull-down stroke of the claw arm is free of any translational movement, and consists of pure rotation about pivot axis 50. Film guide 20 is preferably shaped correspondingly, as indicated in Fig. 3, to guide the film in a circular curve about pivot axis 50 as a center.

As the claw arm swings through its pull-down stroke, the cam dwell surface slides over the curved surface of the transverse follower between two definite contact points. The separation of those contact points depends upon the angle of swing of the claw arm and upon the curvature of the transverse follower surface. For convenience of description in the present specification and claims, the "effective curvature" of the transverse follower surface is here defined as the change in direction of that surface between those two contact points. That change in direction may be taken as the angle between tangents (or between normals) drawn to the surface at the points in question. If the structure is such that the transverse follower surface is not actually contacted by a cam dwell surface at the start and at the end of the pull-down stroke, the surface point closest to the cam shaft axis 51 is to be taken, since that is the point that would be so contacted if a cam dwell surface were in suitable position.

When, as in the present illustrative embodiment, the center of curvature of the transverse follower surfaces lies in the pivot axis, the effective curvature of those surfaces, as just defined, is equal to the angle through which the claw arm swings during the pull-down stroke, shown illustratively as 18°. With that center of curvature differently placed, the effective curvature of the transverse follower surfaces may be either greater or less than the claw arm swing.

In the particular phase position illustrated, second claw arm 44 is near the beginning of its meshing stroke, by which its teeth 46 are brought into engagement with film perforations 40. That stroke, in the particular mechanism illustrated, consists of pure longitudinal translation of the claw arm with respect to pivot axis 50 and is positively driven by interaction of cam stroke faces 77 and 78 of cam 70 with transverse follower surfaces 73 and 74, respectively. During that meshing stroke the rotational position of the claw arm is controlled by interaction of cam dwell faces 75 and 76 with longitudinal follower surfaces 62 and 61, respectively.

Following completion of the pull-down stroke by first claw arm 34, that claw arm is moved in translation to the right in Fig. 3 in an unmeshing stroke which withdraws claw teeth 36 from film engagement. Since the claw teeth in film engaging position extend only a relatively short distance into the film perforations, they release the film near the start of the unmeshing stroke. And correspondingly, during the meshing stroke, illustrated by claw arm 44 in Fig. 3, the claws reach and engage the film only near the end of that stroke. Following the unmeshing stroke and prior to the meshing stroke, the claw arm is swung about pivot axis 50 in a clockwise direction as seen in Fig. 3 in a return stroke. The detailed manner of driving and controlling the unmeshing stroke and the return stroke of each claw arm by its associated cam will be clear from the description that has been given of the pull-down stroke of claw arm 34 and of the meshing stroke of claw arm 44.

It is well known that cams of the type shown may have various proportions, subject to certain geometrical relations. In particular, the cam dwell angle (subtended at the axis of rotation 51 by a cam dwell face) and the cam stroke angle (subtended at the axis of rotation by a cam stroke face) may vary widely in relative magnitude, subject to the limitation that their sum is 180°. Given the ratio of those angles, the cam throw is proportional to the cam diameter. It is also well known that a cam of the described type may be constructed with rounded (instead of sharp) corners, for example by adding a strip of uniform width around the periphery of a cam of the form shown. Addition of such a strip requires more widely spaced cam followers, but affects neither the cycle of operation nor the throw. Such modification replaces each cam corner by a circular surface having its center of curvature at the corner of the original cam. The term "corner" is to be interpreted as including such a surface or its center of curvature, as may be appropriate.

In accordance with the present invention, for reasons that will appear, it is preferred that the dwell period of the claw arm in its meshing movement be substantially equal to and coincident with the duration of the pull-down stroke. When the claw arm is driven both as to its translational and its swinging movement by a single boxed cam, the swinging movement of the claw arm during the pull-down stroke is ordinarily in the same direction as the direction of cam rotation. That is true of the present embodiment. Under that condition, the duration of the pull-down stroke corresponds to the cam stroke angle plus the angle through which the claw arm swings during that stroke. Correspondingly, if the transverse follower surfaces are straight, as is the usual practice, the period of dwell in the meshing movement of the claw arm that accompanies the pull-down stroke has a duration corresponding to the cam dwell angle plus the angle of swing of the claw arm. Under that special condition the duration of the pull-down stroke equals that of the meshing dwell when the cam throw angle and dwell angle are both 90°.

In the present embodiment, however, the transverse follower surfaces are curved. Since the cam dwell faces contact different points of those follower surfaces at the start and at the end of the film advancing stroke, any curvature of the follower surfaces affects the phase relation of the cam with respect to those followers, and hence affects the phase relations of the meshing movement imparted to the followers and to the claw arm. One aspect of the present invention is the selection of the cam dwell angle, in accordance with the angle of swing of the claw arm and with the degree of curvature of the transverse follower surfaces, to satisfy the relation that the pull-down stroke is substantially equal in duration to the corresponding dwell period of the meshing movement.

That is accomplished, in accordance with the invention, by making the dwell angle of the cam equal to its stroke angle plus the effective curvature of the transverse follower surfaces, as defined above. Another statement of the same relation is that the cam dwell angle is equal to 90° plus one half the defined effective follower curvature. In the special preferred case of transverse follower surfaces that are circularly curved about the pivot axis as center, that effective curvature, as already stated, is equal to the angle of swing of the claw arm during the pull-down stroke. Hence with transverse followers of that illustrative type, the cam dwell angle is preferably substantially equal to 90° plus one half the angle of swing of the claw arm. That swing angle is determined primarily by the cam throw and by the distance between the cam shaft axis and the pivot axis.

That relation is shown illustratively in the present embodiment. In the particular mechanism shown, each claw arm swings through an angle of 18° during its pull down stroke (and also during the return stroke). The cam dwell angles are accordingly made substantially equal to 90° plus half the swing angle, or 99°. The cam stroke angles are then 81°, the supplement of the dwell angles. With that typical combination of angles, and with transverse follower surfaces curved as described, the film pull down stroke occupies 81°+18°=99° of revolution of the cam shaft, which is also the period of dwell of the meshing movement. The symmetry of the claw arm causes that dwell period and the pull-down stroke to be simultaneous.

That relation is illustrated diagrammatically for the present embodiment in Fig. 5. That figure includes five distinct but related curves. Curves A and B represent the swinging and meshing movements, respectively, of first claw arm 34; curves C and D represent the swinging and meshing movements, respectively, of second claw arm 44; and curve E represents the film movement produced by cooperative action of the two claw arms. In each instance the horizontal coordinate represents angular rotation of the cam shaft, measured from a common zero position taken arbitrarily at the start of the pull-down stroke of claw arm 34 (curve A). The mechanism is shown in Figs. 3 and 4 at mid-stroke of claw arm 34 and that position is indicated by the vertical line 110 in Fig. 5. Curves C and D for claw arm 44 are identical in form to the corresponding curves A and B for claw arm 34, but are relatively displaced bodily to the right a definite amount, shown typically as 119°. That displacement indicates that each movement of claw arm 44 occurs 119° later than the corresponding movement of claw arm 34, resulting in the present instance from the angular difference in position of the cams 60 and 70 on shaft 58, the former leading the latter by 119°. That phase relation is distinctively different from a relation of opposite phase, which would mean a phase difference of 180°. The present type of phase difference between cams 60 and 70 and the resulting movement cycles of the two claw arms may be characterized as staggered phase relation.

In Fig. 5 curve segment A1 represents the pull-down stroke of claw arm 34 and curve C1 that of claw arm 44, each 99° in duration. Pull-down stroke A1 is followed by a dwell period A2 of the swinging movement, lasting 99°; and is preceded by a dwell period A4 of 99°. The return stroke A3 of claw arm 34 is only 63° in duration, since the claw arm swings during that stroke through 18° in a direction opposite to the direction of cam rotation, effectively reducing the cam stroke angle of 81° by 18°. The meshing movement of claw arm 34 has a dwell period, represented in Fig. 5 by the curve B1, which is 99° in duration and coincides with pull-down stroke A1. Dwell period B1 is preceded by meshing stroke B4, which is just completed at the start of pull-down stroke A1; and is followed by unmeshing stroke B2, which starts immediately upon completion of pull-down stroke A1. Corresponding relations are true of the action of claw arm 44, as represented by curves C and D.

In graphs B and D of Fig. 5, the vertical distance $d$ represents schematically the distance, measured longitudinally of the claw arm, between the positions 113 and 115 of the respective claw arms at which the outer ends of the claw teeth just reach the film and the claw arm positions at which the claw teeth are fully inserted into film perforations 40, as at B and D1. Hence the point of unmeshing stroke B2 of claw arm 34 at which claw teeth 36 have just fully released the film is represented by the intersection 112 of curve B2 and the horizontal line 113. The instant of film release 112 follows the start of the unmeshing stroke by a definite time interval. That film release time is represented in terms of cam rotation by the distance $t$ in graph B, shown illustratively as 20°.

Similarly, the point of the meshing stroke D4 of claw arm 44 at which claw teeth 46 have just reached the film face and are about to engage the film is represented in graph D by the intersection 114 of curve D4 and the horizontal line 115, which is spaced below curve D1 by the distance $d$. Since the meshing and unmeshing strokes are symmetrical, and since the cycles of the two claw arms are identical in form, point 114 of film engagement precedes completion of the meshing stroke by a film engagement time that is equal to film release time $t$, or 20° in the present embodiment.

Under that typical condition, the effective phase difference between the cycles of claw arms 34 and 44 is preferably made equal to the sum of the duration of the pull-down stroke of either claw arm and the film release (or film engagement) time $t$. In the present embodiment that phase difference is then 99+20=119°, as shown in Figs. 3 and 5.

In accordance with the present particular aspect of the invention the following sequence of events takes place, as clearly represented in Fig. 5. At 99°, immediately upon conclusion of pull-down stroke A1 of first claw arm 34, when the first film movement E1 caused by that stroke has just ceased, unmeshing stroke B2 starts to withdraw claw teeth 36 from the film. At the same moment claw teeth 46 of the second claw arm move across the film face into film engagement under control of meshing stroke D4, which started during the pull-down stroke A1 of the first claw arm but reached the film face at 114 only at the conclusion of that pull-down stroke. During the next 20° of cam rotation both claw arms are in dwell periods (A2 and C4) with respect to their swinging movements, and the film remains stationary in a first, relatively short dwell period, indicated by curve E2. At 119°, when claw teeth 34 have just reached point 112 of unmeshing stroke B2, fully releasing the film, and when teeth 44 have just attained full film engagement at the conclusion of meshing stroke D4, pull-down stroke C1 of claw arm 44 starts. That stroke produces a second film movement E3, after which the film is again brought to rest.

The total distance traveled by the film in both stages of its movement E1 and E3 is indicated in Fig. 5 at L and corresponds typically to the interval between successive picture frames of the film F. The film dwell period E4, which follows the second pull-down stroke and continues until the first pull-down stroke of the following cycle, is relatively long. In the present example, it occupies 142° of cam rotation. That film dwell period is available for film exposure, for projection of a frame image, or for other function. The opening in shutter 23 (Fig. 1) corresponds in angle and phase to that film dwell period E4; and the aperture-covering blade of the shutter corresponds in angle and phase to a continuous period that includes both stages of film movement E1 and E3 and the relatively short dwell period E2 between them.

By providing for each claw arm a dwell period in its meshing movement equal to the duration of its pull-down stroke, and by making the two simultaneous, the pull-down strokes of the two claw arms may follow each other in relatively rapid succession with a minimum period of film dwell (E2) between them, while still maintaining the preferred relation that the swinging and meshing movements of each claw arm are non-overlapping in time.

If the cam stroke angle is made shorter than is required to satisfy that condition, each stroke itself requires a correspondingly shorter time, and the dwell periods are correspondingly lengthened. However, the resulting more rapid pull-down stroke can be only partially utilized to reduce the overall time required for the two stages of film movement, since the pull-down stroke of the second claw arm cannot start until the film has been fully released by the first claw arm. That requires, of course, that the unmeshing stroke of the first claw arm be started and carried far enough to withdraw the claws from the film; and the start of that unmeshing stroke is delayed by the relatively long cam dwell angle, which is a necessary result of the reduced cam stroke angle. Hence, the advantage of a more rapid pull-down stroke is partially overcome by the delay in film release by the first claw arm.

A dual claw arm mechanism may alternatively be employed to advance a film intermittently at uniform time intervals, two such advances typically occurring during each revolution of the cam shaft. Such a mechanism is illustratively indicated in Fig. 6, which shows cams 60 and 70 mounted in opposite phase on their common cam shaft 58a. Except for that difference in phase relation, the claw arm mechanism may, for example, be the same as that already described in connection with Figs. 3 and 4. With the claw arms actuated in opposite phase, each revolution of the cam shaft then produces two film advancing strokes of 99° each, and two film dwell periods of 81° each. The shutter of Figs. 1 and 2 is replaced by a shutter that covers the exposure aperture during each film advancing stroke and uncovers it during each film dwell period. For example, a one-bladed shutter may be provided of the type shown in Fig. 1, but driven at twice the speed of the cam shaft. Alternatively, a two-bladed shutter may be driven at the same speed as cam shaft 58a, as indicated at 23a in Fig. 6, the blades being substantially 99° wide in the present illustrative example.

With the claw arms in opposite phase, and with each claw arm operating at any given cyclic frequency, the frame frequency of the intermittent is double that of a conventional movement having only a single claw arm. Furthermore, vibration of the mechanism is greatly reduced by the balanced action of the two claw arms. The type of movement described therefore offers great advantages, particularly for operation at high frame frequencies.

As illustrated in the present drawings, only a single pair of cooperating claw arms is shown, engaging alternately a single row of film perforations. Such mechanisms may be used typically for advancing 16 mm. sound films, which have a single row of perforations along one edge. For use with 35 mm. or 70 mm. film, which normally carries two widely spaced rows of perforations, the claw mechanism of Figs. 3 and 4, for example, may be duplicated, both pairs of claw arms being driven preferably by the same shaft in accurate synchronization.

Many modifications may be made in the devices here illustratively described without departing from the scope of the invention, which is defined in the appended claims.

I claim:

1. Kinetograph mechanism for intermittently advancing a film through a predetermined frame distance, comprising in combination a film guide, first and second film advancing means capable of respective cycles of operation that include successive movements to engage a film in the guide, to advance the film respective predetermined distances along the film guide, and to release the film, the sum of the said distances corresponding to the said frame distance, and driving mechanism for driving the two film advancing means in staggered mutual phase relation, with the second film advancing means engaging the film substantially immediately after completion of the film advancing movement of the first film advancing means, and the first film advancing means releasing the film substantially immediately before the start of the film advancing movement of the second film advancing means, the film advancing movements of both film advancing means being in the same direction.

2. Kinetograph mechanism for intermittently advancing a film through a predetermined frame distance, comprising in combination structure forming an exposure aperture, a film guide for guiding a film past the exposure aperture, first and second film advancing means having respective film engaging structures and operable to periodically engage and advance a film in the same direction in the film guide in respective film advancing strokes, the sum of the respective distances of film advance of the two strokes corresponding to the said frame distance, driving mechanism for driving the two film advancing means with a common period and in staggered mutual phase relation, the strokes of each film advancing means alternating with strokes of the other, and each stroke of the second film advancing means being substantially immediately preceded by a stroke of the first film advancing means and being followed by an appreciable period of film dwell.

3. Kinetograph mechanism for intermittently advancing a film through a predetermined frame distance, comprising in combination structure forming an exposure aperture, a film guide for guiding a film past the exposure aperture, first and second film advancing means having respective film engaging structures and operable to periodically engage and advance a film in the same direction in the film guide in respective film advancing strokes, the sum of the respective distances of film advance of the two strokes corresponding to the said frame distance, driving mechanism for driving the two film advancing means with a common period and in staggered mutual phase relation, the strokes of each film advancing means alternating with strokes of the other, and a shutter driven in timed relation to the two film advancing means and acting during each cycle of the said common period to cover the exposure aperture continuously during a time period that includes adjacent strokes of both film advancing means and to uncover the exposure aperture only during a period of film dwell.

4. Kinetograph mechanism for intermittently advancing a film through a predetermined frame distance, comprising in combination a film guide for guiding the film for longitudinal movement, first and second film advancing shuttles mounted for movement in respective periodic movement cycles and carrying respective film engaging claw formations, the movement cycles of both shuttles including movement of their respective carried claw formations into film engagement, a succeeding film advancing movement longitudinally of the guide, and a film releasing movement following the film advancing movement, the film advancing movements of both shuttles being in the same direction and the sum of said advancing movements being equal to the frame distance, and driving means for the shuttles acting to cause their claw formations to move through their film advancing movements alternately, said driving means driving the shuttles in such mutual phase relation that the film engaging movement of the second shuttle is substantially simultaneous with the film releasing movement of the first shuttle.

5. Kinetograph mechanism for intermittently advancing a motion picture film having a longitudinal row of film perforations, said mechanism comprising in combination a cam shaft, driving means for the cam shaft, two cam means comprising respective cams rigidly mounted on the cam shaft in respective positions mutually spaced axially and rotationally, two claw carrying shuttles mounted for film meshing and advancing movements in the respective axially spaced planes of the cam means and carrying respective cam followers that engage the respective cam means, the cam means acting to drive the shuttles in respective periodic cycles of movement in parallel axially spaced movement planes, claw formations mounted on the respective shuttles for movement therewith in a common plane parallel to the movement planes of the shuttles, and a film guide for guiding the film for longitudinal movement with the row of film perforations in position to be engaged for film advancement alternately by the claw formations of the respective shuttles, the two cam means being mounted on the cam shaft in substantially opposite phase relation.

6. Kinetograph mechanism for intermittently advancing a motion picture film having a longitudinal row of film perforations, said mechanism comprising in combination a cam shaft, driving means for the cam shaft, two cam means comprising respective cams rigidly mounted on the cam shaft in respective positions mutually spaced axially and rotationally, two claw carrying shuttles mounted for film meshing and advancing movements in the respective axially spaced planes of the cam means and carrying respective cam followers that engage the respective cam means, the cam means acting to drive the shuttles in respective periodic cycles of movement in parallel axially spaced movement planes, claw formations mounted on the respective shuttles for movement therewith in a common plane parallel to the movement planes of the shuttles, and a film guide for guiding the film for longitudinal movement with the row of film perforations in position to be engaged for film advancement alternately by the claw formations of the respective shuttles, the two cam means being mounted on the cam shaft in staggered relation, whereby each rotation of the cam shaft includes only one appreciable period of film dwell; said film guide including an exposure aperture, and a shutter driven in timed relation to the rotation of the cam shaft and acting to cover the exposure aperture continuously during a time period that includes advancement of the film by both shuttles, and to uncover the exposure aperture only during the said period of film dwell.

7. Kinetograph mechanism for intermittently advancing a motion picture film having a longitudinal row of film perforations, said mechanism comprising in combination a cam shaft, driving means for the cam shaft, two cams of constant diameter type rigidly mounted on the cam shaft in respective positions mutually spaced axially and rotationally, two claw arms slidingly pivoted on a common pivot axis parallel to and spaced from the cam shaft and carrying respective cam followers of box type that engage the respective cams, the cams acting to drive the claw arms in respective periodic cycles of movement in parallel axially spaced movement planes, claw formations mounted on the respective claw arms for movement therewith in a common plane parallel to the movement planes, and a film guide for guiding the film in a transverse plane for longitudinal film movement parallel to the said movement planes and with the row of film perforations in the said common plane and in position to be engaged alternately by claw formations of the respective claw arms; the transverse follower surfaces being curved and the dwell angle of each cam being substantially equal to the sum of its stroke angle and the effective curvature of the transverse follower surfaces of the associated claw arm.

References Cited in the file of this patent
UNITED STATES PATENTS

| | | |
|---|---|---|
| 1,037,112 | Bingham | Aug. 27, 1912 |
| 2,136,930 | Albrecht | Nov. 15, 1938 |

FOREIGN PATENTS

| | | |
|---|---|---|
| 854,768 | France | Jan. 24, 1940 |